(12) United States Patent
Poon et al.

(10) Patent No.: US 8,292,581 B2
(45) Date of Patent: Oct. 23, 2012

(54) AIR COOLED TURBINE BLADES AND METHODS OF MANUFACTURING

(75) Inventors: Kin C. Poon, Tempe, AZ (US); Malak F. Malak, Tempe, AZ (US); Rajiv Rana, Tempe, AZ (US); Ardeshir Riahi, Scottsdale, AZ (US); David H. Chou, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1173 days.

(21) Appl. No.: 11/971,459

(22) Filed: Jan. 9, 2008

(65) Prior Publication Data

US 2009/0175733 A1  Jul. 9, 2009

(51) Int. Cl.
*F01D 5/08* (2006.01)
(52) U.S. Cl. .................................................. 416/97 R
(58) Field of Classification Search .................. 415/115; 416/90 R, 96 R, 97 R
See application file for complete search history.

(56) References Cited

U.S. PATENT DOCUMENTS

| | | | |
|---|---|---|---|
| 5,660,524 A | 8/1997 | Lee et al. | |
| 5,702,232 A | 12/1997 | Moore | |
| 5,720,431 A | 2/1998 | Sellers et al. | |
| 5,813,835 A | 9/1998 | Corsmeier et al. | |
| 5,931,638 A | 8/1999 | Krause et al. | |
| 6,168,381 B1 | 1/2001 | Reddy | |
| 6,607,356 B2 | 8/2003 | Manning et al. | |
| 6,705,836 B2 * | 3/2004 | Bourriaud et al. | 416/97 R |
| 6,984,103 B2 | 1/2006 | Lee et al. | |
| 7,011,502 B2 | 3/2006 | Lee et al. | |
| 2002/0119045 A1 | 8/2002 | Starkweather | |
| 2002/0119047 A1 | 8/2002 | Starkweather | |
| 2003/0026698 A1 | 2/2003 | Flodman et al. | |
| 2003/0044277 A1 | 3/2003 | Bourriaud et al. | |
| 2003/0133797 A1 | 7/2003 | Dailey | |
| 2005/0111976 A1 | 5/2005 | Lee | |
| 2005/0169752 A1 | 8/2005 | Lee et al. | |
| 2005/0232768 A1 | 10/2005 | Heeg et al. | |
| 2005/0281673 A1 | 12/2005 | Draper et al. | |
| 2006/0002795 A1 | 1/2006 | Liang | |
| 2008/0019840 A1 * | 1/2008 | Cunha | 416/96 R |
| 2008/0056908 A1 * | 3/2008 | Morris et al. | 416/97 R |

FOREIGN PATENT DOCUMENTS

EP  1420143 A1  5/2004

OTHER PUBLICATIONS

Examination Report for Application No. GB0820517, mailed Mar. 11, 2009.

* cited by examiner

*Primary Examiner* — Dwayne J White
(74) *Attorney, Agent, or Firm* — Ingrassia Fisher & Lorenz, P.C.

(57) ABSTRACT

An air-cooled turbine blade and methods of manufacturing the blade are provided. The blade includes a suction side flow circuit formed within its interior and defined at least by an interior surface of a convex suction side wall, a pressure side flow circuit formed within the blade interior and defined at least by an interior surface of a concave pressure side wall, and a center flow circuit including a first section and a second section, the first section disposed between the suction side flow circuit and the pressure side flow circuit, and the second section in flow communication with the first section and a plurality of openings of a leading edge wall and defined at least partially by an interior surface of the leading edge wall.

16 Claims, 5 Drawing Sheets

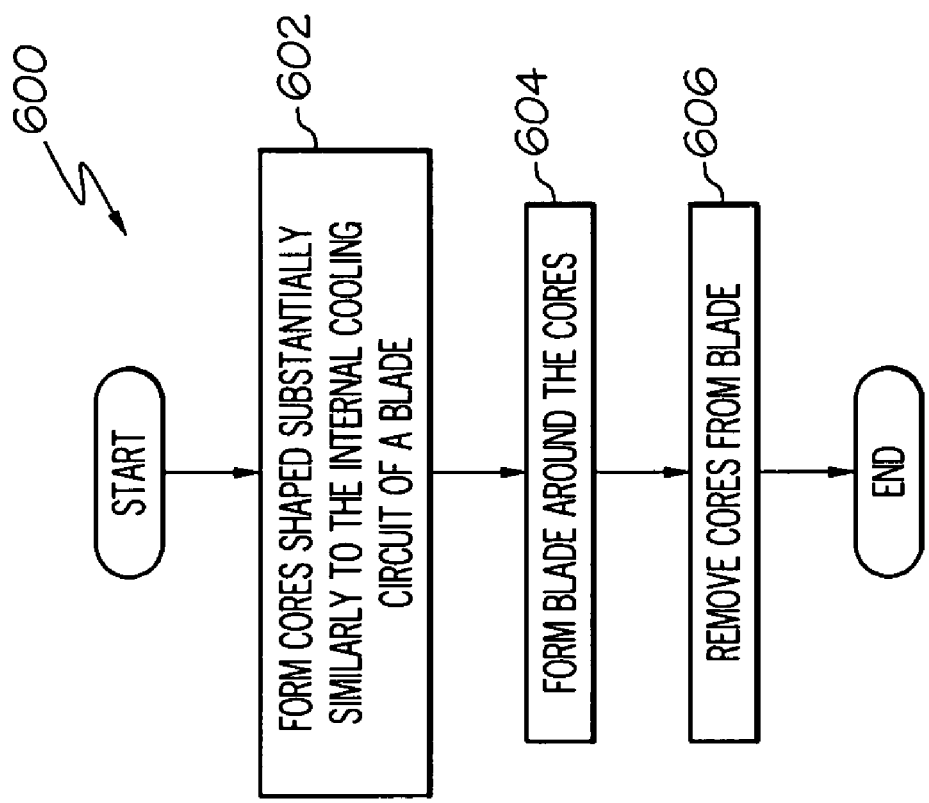

AIR COOLED TURBINE BLADES AND METHODS OF MANUFACTURING

STATEMENT REGARDING FEDERALLY SPONSORED RESEARCH OR DEVELOPMENT

This inventive subject matter was made with Government support under USAF F33615-03-D-2355 awarded by the United States Air Force. The Government has certain rights in this inventive subject matter.

TECHNICAL FIELD

The inventive subject matter relates to turbines and, more particularly, to turbine blades and methods of manufacturing turbine blades.

BACKGROUND

Gas turbine engines, such as turbofan gas turbine engines, may be used to power various types of vehicles and systems, such as, for example, aircraft. Typically, these engines include turbine blades (or airfoils) that are impinged by high-energy compressed air that causes a turbine of the engine to rotate at a high speed. Consequently, the blades are subjected to high heat and stress loadings which, over time, may reduce their structural integrity.

Modern aircraft jet engines have employed internal cooling systems in the blades to maintain the blade temperatures within acceptable limits. Typically, the blades are air cooled using, for example, bleed air from a compressor section of the engine. The air may enter near the blade root, and then flow through a cooling circuit formed in the turbine blade. The cooling circuit typically consists of a series of connected cooling passages that form serpentine paths, which increase the cooling effectiveness by extending the length of the air flow path.

One exemplary cooling system is multi-walled and includes independent cooling circuits for surfaces of a blade, such as pressure and suction side surfaces, to thereby control specific heat load distributions thereon. The walls form intricate serpentine passages in an interior of the blade through which the cooling air flows. The serpentine passages may include pin fins, turbulators, turning vanes, and other structures therein.

Although the cooling system operates adequately to cool the blade's pressure and suction side surfaces, it has been found that other portions of the blade may not be sufficiently cooled. For example, a leading edge of the blade is typically exposed to extreme heat environments during engine operation and may not be capable of maintaining its structural integrity when exposed to such temperatures. As a result, the blade leading edge may be more susceptible to foreign object damage. If damaged, the blade may become punctured and the cooling system may not operate as designed.

Hence, there is a need for an improved cooling system that is capable of cooling a blade leading edge in extreme heat environments without allowing the blade to become prematurely worn. Additionally, it would be desirable for the system to be designed such that the blade may be manufactured relatively easily and inexpensively.

BRIEF SUMMARY

The inventive subject matter provides an air-cooled turbine blade having a convex suction side wall, a concave pressure side wall, a leading edge wall, a trailing edge wall, a root and a tip, the walls and the tip each including an inner surface that defines an interior with the root, the leading edge wall including a plurality of openings, and the trailing edge wall including a plurality of slots formed thereon.

In an embodiment, and by way of example only, the blade includes a suction side flow circuit formed within its interior and defined at least by an interior surface of the convex suction side wall, a pressure side flow circuit formed within the blade interior and defined at least by an interior surface of the concave pressure side wall, and a center flow circuit including a first section and a second section. The first section is disposed between the suction side flow circuit and the pressure side flow circuit, and the second section is in flow communication with the first section and a plurality of openings of a leading edge wall. The second section is defined at least partially by an interior surface of the leading edge wall.

In another embodiment, and by way of example only, the turbine blade includes a suction side flow circuit, a pressure side flow circuit, a center flow circuit, and a plurality of pressure side wall openings. The suction side flow circuit is formed within the blade interior and is defined at least by the interior surface of the convex suction side wall. The pressure side flow circuit is formed within the blade interior and is defined at least by the interior surface of the concave pressure side wall. The center flow circuit includes a first section, a second section, and a plurality of channels. The first section is disposed between the suction side flow circuit and the pressure side flow circuit, and the second section is in flow communication with the first section and the plurality of openings of the leading edge wall and is defined at least partially by the interior surface of the leading edge wall. The plurality of channels extends between the first and the second sections providing flow communication there between. The plurality of pressure side wall openings is formed through the concave pressure side wall in flow communication with the pressure side flow circuit.

In still another embodiment, by way of example only, a method of manufacturing is provided for a blade having an airfoil shape defined by a convex suction side wall, a concave pressure side wall, a leading edge, a trailing edge, a root and a tip, the walls and the tip each including an interior surface that defines an interior with the root, and the trailing edge including a plurality of slots formed thereon. The method includes forming a plurality of cores shaped substantially similarly to a plurality of flow circuits including a suction side flow circuit formed within the blade interior and defined at least by the interior surface of the convex suction side wall, a pressure side flow circuit formed within the blade interior and defined at least by the interior surface of the concave pressure side wall, and a center flow circuit including a first section and a second section, the first section disposed between the suction side flow circuit and the pressure side flow circuit, and the second section in flow communication with the first section and the plurality of openings of the leading edge wall and defined at least partially by the interior surface of the leading edge wall. The method also includes forming the blade around the cores and removing the cores from the blade.

Other independent features and advantages of the preferred blade will become apparent from the following detailed description, taken in conjunction with the accompanying drawings which illustrate, by way of example, the principles of the inventive subject matter.

BRIEF DESCRIPTION OF THE DRAWINGS

FIG. 6 is a flow diagram of an exemplary method of manufacturing the blade, according to an embodiment.

DETAILED DESCRIPTION OF A PREFERRED EMBODIMENT

The following detailed description of the inventive subject matter is merely exemplary in nature and is not intended to limit the inventive subject matter or the application and uses of the inventive subject matter. Furthermore, there is no intention to be bound by any theory presented in the preceding background or the following detailed description.

Figure 1:
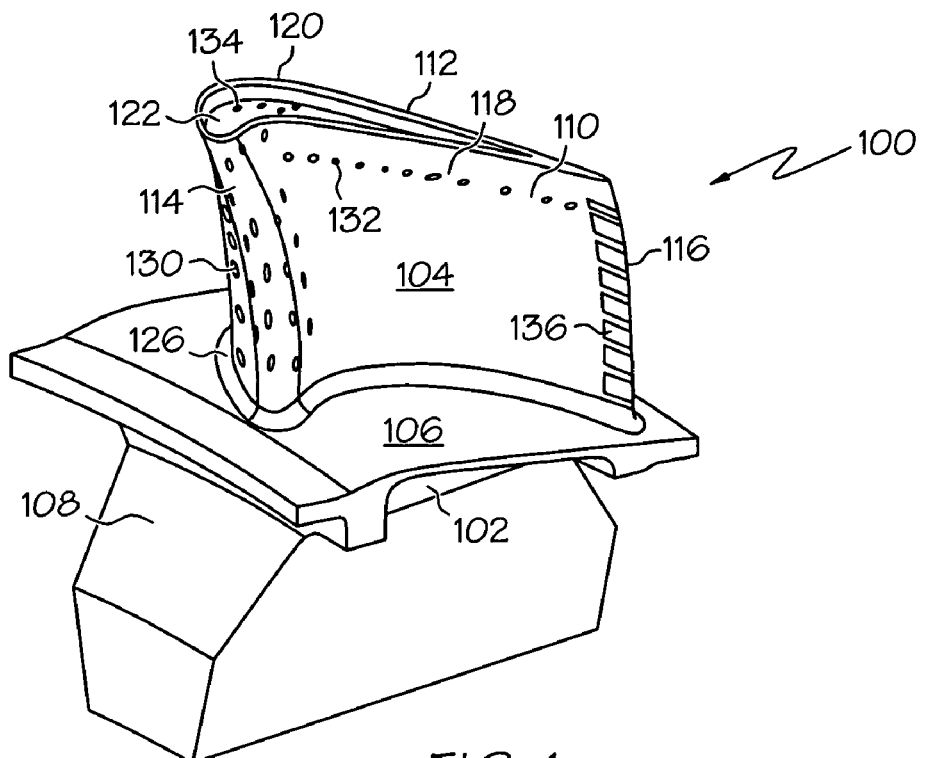
FIG. 1 is a perspective pressure (concave) side view of a turbine blade, according to an embodiment.
Figure 2:
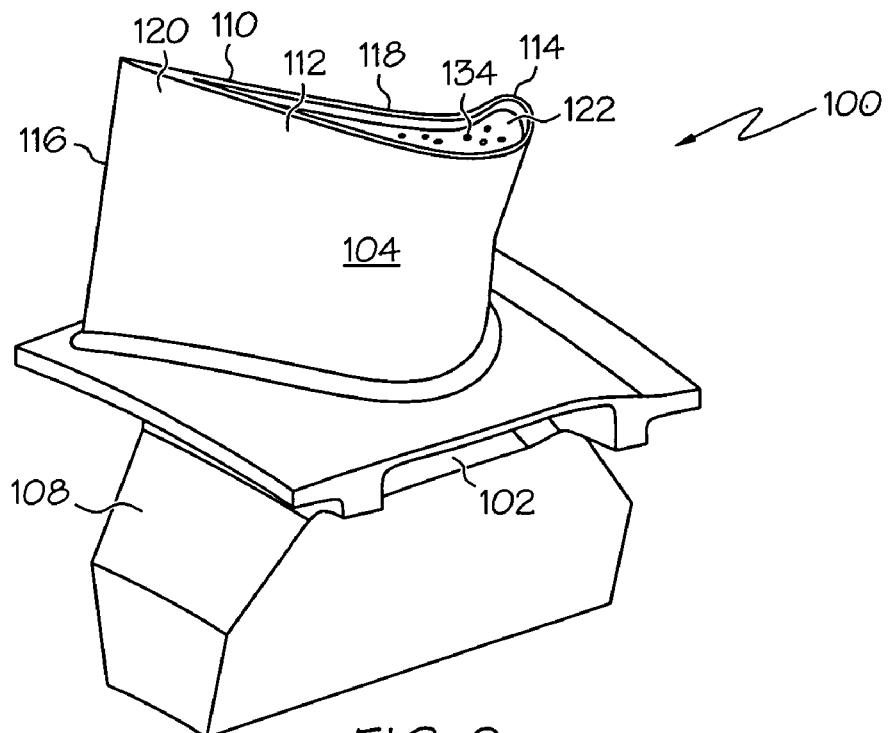
FIG. 2 is another perspective suction (convex) side view of the turbine blade of FIG. 1, according to an embodiment.

FIGS. 1 and 2 illustrate a turbine blade 100 that may be used in an aircraft jet engine. In an embodiment, the turbine blade 100 includes a shank 102, an airfoil 104, a platform 106 and a root 108. The platform 106 is configured to radially contain turbine airflow from a non-illustrated air source. The root 108 is used to attach the blade 100 to a turbine rotor disc (not illustrated). Although the root 108 is shown to have a fir-tree shape, it will be appreciated that other suitable shapes for attaching the blade 100 to the turbine disc may be alternatively machined therein.

The airfoil 104 has a concave outer wall 110, a convex outer wall 112, leading edge wall 114, trailing edge 116, and tip wall 122, each having outer surfaces that together define an airfoil shape. The airfoil shape also includes a pressure side 118 along the concave outer wall 110, a suction side 120 along the convex outer wall 112, and an airfoil platform fillet 126. To cool the concave outer wall or "pressure side wall" 110, the convex outer wall or "suction side wall" 112, and tip wall 122, an interior portion of the blade 100 includes an internal cooling circuit 128 (shown in FIGS. 3-5) that is configured to direct air from the root 108 to one or more rows of leading edge cooling holes 130, pressure side wall openings 132, tip wall cooling holes 134 and/or trailing edge slots 136.

Figure 3:
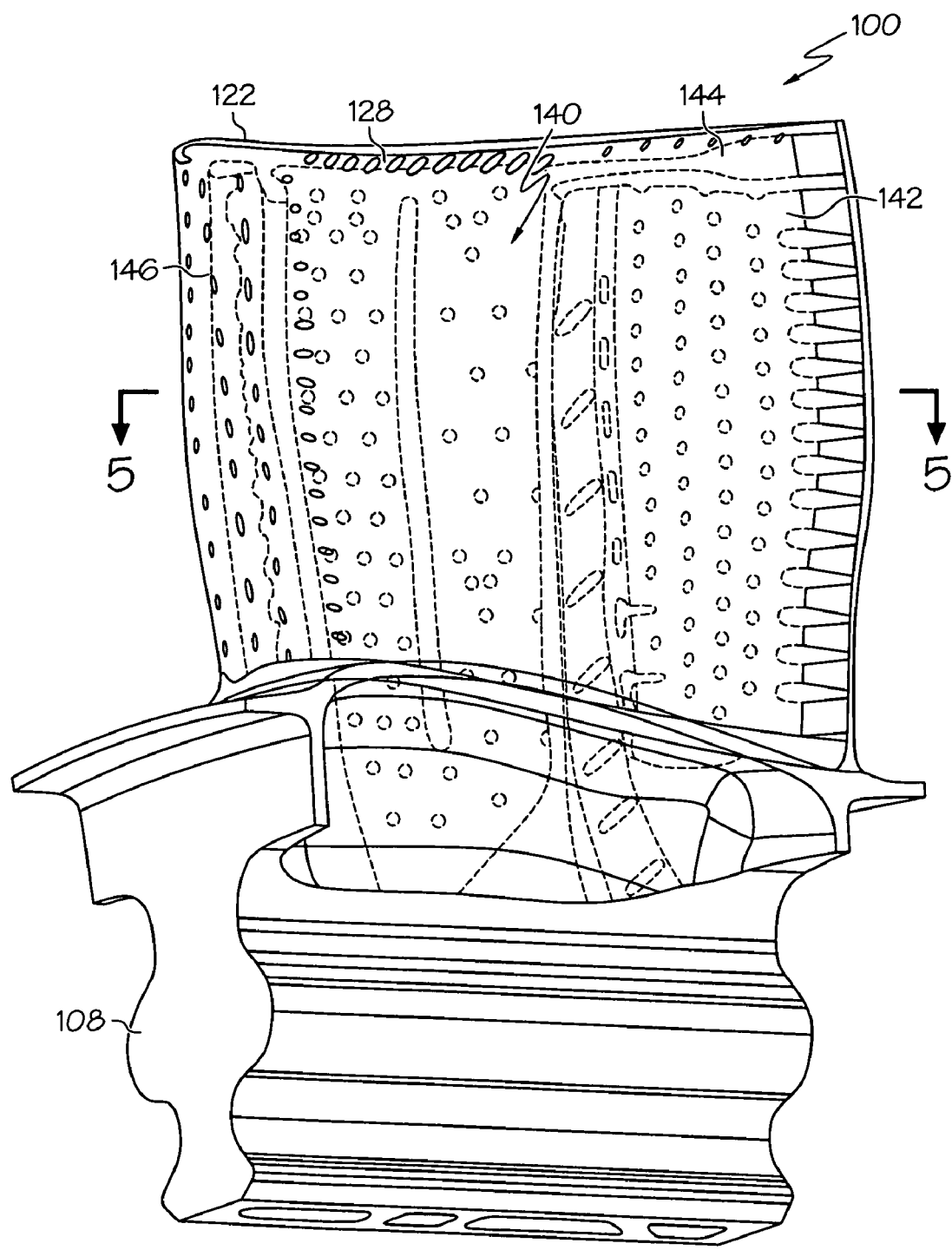
FIG. 3 is a cutaway perspective view of the turbine blade showing the blade cooling circuits in dotted lines, according to an embodiment.
Figure 4:
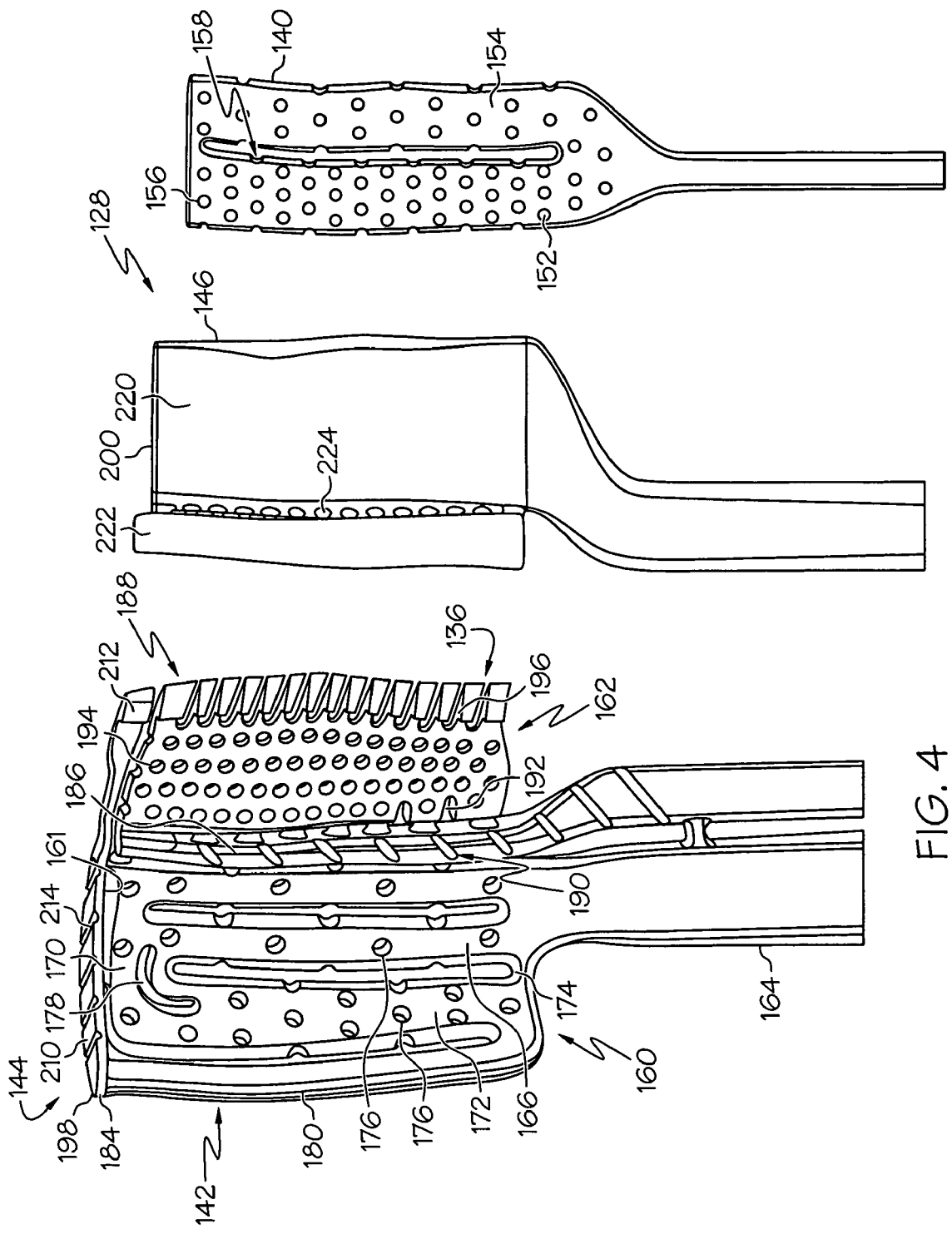
FIG. 4 is a reverse image of a pressure side exploded view of the cooling circuits shown in FIG. 3, according to an embodiment.
Figure 5:
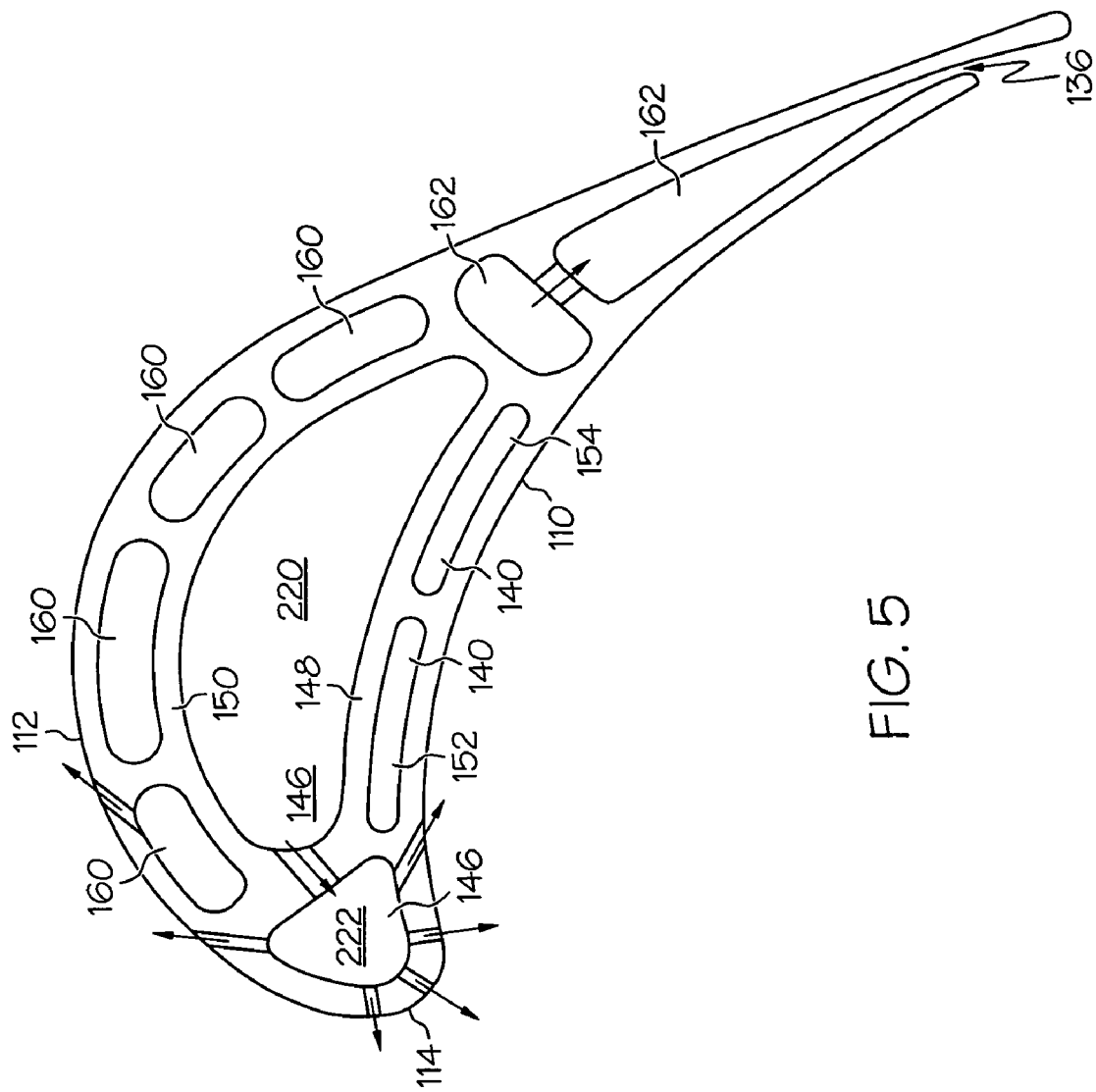
FIG. 5 is a cross section view of the blade taken along lines 5-5 of FIG. 3, according to an embodiment.

Different views of the internal cooling circuit 128 are shown in FIGS. 3-5. In particular, FIG. 3 is a cutaway perspective view of the blade 100 including the internal cooling circuit 128, FIG. 4 includes reverse images of the internal cooling circuit 128, and FIG. 5 is a cross section view of the blade 100 and internal cooling circuit 128. The internal cooling circuit 128 is made up of a pressure side flow circuit 140, a suction side flow circuit 142, a tip flow circuit 144, and a center flow circuit 146. The pressure side flow circuit 140 directs air from the root 108 along the pressure side wall 110. The suction side flow circuit 142 receives air from the root 108 and directs the air along the suction side wall 112. The tip flow circuit 144 receives air from a portion of the suction side flow circuit 142 and directs the air along a portion of the tip wall 122. The center flow circuit 146 takes air from the root 108 to cool the leading edge wall 114 and interior walls 148, 150. Each of these flow circuits 140, 142, 144, 146 will now be discussed in detail.

The pressure side flow circuit 140 is defined, in part, by an interior surface of the pressure side wall 110 and interior wall 148 (shown in FIG. 5). To enhance cooling of the pressure side wall 110, the pressure side flow circuit 140 is made up of at least two passages 152, 154 in an embodiment, that each include a plurality of full pin fins 156 and partial pins 158 that optimize flow and heat transfer characteristics of the flow circuit 140. Air flows through the passages 152, 154 and out openings 132 and 134 (shown in FIG. 1) formed in the pressure side wall 110 to form a cooling air film on a portion of an outer surface thereof.

As mentioned briefly above, the suction side flow circuit 142 directs cooling air from the root 108 to one or more of the trailing edge slots 136 or to the tip flow circuit 144. The suction side flow circuit 142 is divided into a suction side forward flow circuit 160 and a suction side aft flow circuit 162. The suction side forward flow circuit 160 is defined by an interior surface of the suction side wall 112 and interior wall 150 and draws its cooling air from an inlet channel 164. The cooling air proceeds radially outwardly into a first segment 166 of a serpentine passage, curves around a bend 170, and into a second segment 172 of the serpentine passage.

In some embodiments, a super-charger channel 174 may be incorporated proximate the inlet channel 164 between the first and second segments 166, 172 to thereby provide flow communication therebetween. In still other embodiments, pins 176 may be included in the first and/or second segments 166, 172. In other embodiments, a turning vane 178 may be disposed in the bend 170. In these cases, the pins 176 and turning vane 178 may be positioned to disperse the flow of air through the first and second segments 170, 172 such that the airflow does not separate from the interior surfaces of the walls 112, 150. After the air travels through the second segment 172, it is directed radially outwardly along a third segment 180 that may include a plurality of turbulators disposed therein. The air then exits the suction side forward flow circuit 160 into the tip flow circuit 144 via an outlet 184.

The suction side aft flow circuit 162 is defined by an interior surface of the suction side wall 112 and the interior wall 150 and includes a stem section 186 and a pin bank section 188. The stem section 186 is configured to direct the cooling air radially outwardly and includes a plurality of turbulators 190 therein. Several cross over holes 192 may be located along the length of the stem section 186 to allow flow communication with the pin bank section 188. The pin bank section 188 includes a plurality of pins 194 and fins 196 and is configured to direct the air out the trailing edge slots 136.

With continued reference to FIGS. 3-5, the tip flow circuit 144 cools the tip wall 122 and is defined in part by the tip wall 122. As briefly mentioned above, the tip flow circuit 144 receives its cooling air from the suction side forward flow circuit 160. In this regard, the tip flow circuit 144 includes a first opening 198 that communicates with a forward portion of the suction side forward flow circuit 160 and a second opening 161 that communicates with an aft portion of the suction side forward flow circuit 160. In another embodiment, the tip flow circuit 144 may receive cooling air from the center flow circuit 146 via a third opening 200.

In an embodiment, the tip flow circuit 144 includes a flag section 210 and an exit section 212. The flag section 210 communicates with the suction side forward flow circuit 160 and, in some embodiments, the center flow circuit 146, and includes rougheners that are formed on interior surface of the tip walls 122. The rougheners may be any one of numerous structures capable of augmenting heat transfer between the air and the blade 100, and in this embodiment, are shown as a plurality of turbulators 214. The exit section 212 may include rougheners, such as depressions, over which the cooling air flows before it exits the trailing edge slots 136. The air may alternatively exit the tip flow circuit 144 via cooling holes 134 formed through the tip wall 120.

The center flow circuit 146 directs air from the root 108 to the leading edge wall 114 and includes a first section 220 and a second section 222. The first section 220 is formed by the interior walls 148, 150 and extends between the pressure and suction side flow circuits 140, 142. The second section 222 is defined by an interior surface of the leading edge wall 114 and the interior wall 148 and communicates with the first section 220 via a plurality of channels 224. Locating the first section 220 of the center flow circuit 146 between the pressure and suction side flow circuits 140, 142 allows air flowing therethrough to remain cool. As a result, cool air flowing into the second section 222 remains cool when it is directed to the leading edge wall 114 and out cooling holes 130 therein. The cool air can then be used to form a cooling film over the outer surface of the leading edge wall 114.

The blade 100 is produced using an exemplary method 600 illustrated in FIG. 6. First, cores are formed that are shaped substantially similarly to the internal cooling circuit 128, step 602. The blade 100 is formed around the cores, step 604. Then, the cores are removed from the formed blade 100, step 606. Each of these steps will now be discussed in more detail below.

As briefly mentioned above, the cores are first formed and are shaped substantially similarly to the airfoil internal cooling circuit 128, step 602. In an embodiment, three total cores are formed. For example, a first core is formed for the pressure side flow circuit 140, a second core is formed for the suction side flow circuit 142 and tip flow circuit 144, and a third core is formed for the center flow circuit 146. Examples of flow circuit shapes are depicted in FIGS. 3 and 4.

After the cores are formed, the blade 100 is formed around the cores, step 604. In one exemplary embodiment, the blade 100 is formed using a lost wax casting process. In this regard, the cores are first placed in a wax pattern die. Wax is then injected around the cores to produce a wax pattern of the turbine blade 100. The wax pattern is dipped in ceramic slurry and dried to form an outer mold. The outer mold is then heated until the wax melts. The wax is then removed from the outer mold, and the outer mold is placed in a furnace, heated, and filled with a metal material to produce a turbine blade casting. It will be appreciated that the metal material may be any one of numerous metal materials suitable for forming the blade 100, such as, for example, nickel-based superalloys, which may be equi-axed, directionally solidified, or single crystal.

Then, after the metal material solidifies and the blade 100 is formed, the outer mold is removed from the blade outer surface and the cores are removed from the blade 100, step 606. Consequently, cavities are left in the blade 100 forming the internal cooling circuit 128 and the roughened surfaces of the walls 110, 112, 114, 122, 148, 150 are exposed. In an embodiment, the cores are chemically removed from the blade 100 using a suitably formulated composition that dissolves the cores. In another embodiment, the core material is leached out using a conventional caustic solution, such as sodium or potassium hydroxide, as is common in the core removal industry. Core removal may be verified using a combination of water flow, air flow, N-ray, and thermal imaging inspections.

The cooling holes and openings formed in the walls 110, 112, 114, 122, may be formed after the cores are removed. For example, in some embodiments, the holes and openings are machined into the walls 110, 112, 114, 122. In one embodiment, three rows of cooling holes, referred to as "shower head" cooling holes may be machined into the leading edge wall 114. In another embodiment, an additional row of cooling holes may be formed on the leading edge wall 114 proximate the suction side wall 112 and another additional row of cooling holes may be formed on the leading edge wall 114 proximate the pressure side wall 110. In still another embodiment, openings may be formed along the pressure side wall 110 proximate the tip wall 122. In still yet another embodiment, openings may be formed through the tip wall 122.

Hence, a new blade having improved cooling capabilities over previously known blades has been provided. By directing cooling air directly from the root 108 to the leading edge wall 114 via the center flow circuit, improved cooling is provided to the blade 100. Additionally, because the pressure side flow circuit 142 feeds air directly to pressure side wall openings 132 and is separated from the suction side flow circuit 144, the two flow circuits 140, 144 may be individually tailored to meet cooling needs of the pressure side wall 110 and suction side wall 112, respectively. A method for forming the improved blade has also been provided. The method may be incorporated into existing manufacturing processes and is relatively simple and inexpensive to implement.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. An air-cooled turbine blade having a convex suction side wall, a concave pressure side wall, a leading edge wall, a trailing edge wall, a root and a tip, the walls and the tip each including an inner surface that defines an interior with the root, the leading edge wall including a plurality of openings, and the trailing edge wall including a plurality of slots formed thereon, the turbine blade comprising:

a suction side flow circuit formed within the blade interior and defined at least by the interior surface of the convex suction side wall, the suction side flow circuit comprising a forward flow circuit, an aft flow circuit, and a tip flow circuit, the forward flow circuit extending from the root to the tip and comprising, a serpentine passage, a first outlet, and a second outlet, the first outlet in communication with the aft flow circuit, and the second outlet in communication with the tip flow circuit, the aft flow circuit extending from the root in flow communication with the forward flow circuit and at least one of the trailing edge slots, and the tip flow circuit extending along the tip interior surface to at least one of the trailing edge slots and comprising a pin bank section, a first opening, and a second opening, the first opening in flow communication with the forward flow circuit outlet, and the second opening in flow communication with the suction side forward flow circuit;

a pressure side flow circuit formed within the blade interior and defined at least by the interior surface of the concave pressure side wall; and a center flow circuit including a first section and a second section, the first section disposed between the suction side flow circuit and the pressure side flow circuit, and the second section in flow communication with the first section and the plurality of openings of the leading edge wall and defined at least partially by the interior surface of the leading edge wall.

2. The turbine blade of claim 1, wherein:
the center flow circuit includes a plurality of channels between the first and the second sections providing flow communication therebetween.

3. The turbine blade of claim 1, further comprising a plurality of tip wall cooling holes formed through the tip in flow communication with the tip flow circuit.

4. The turbine blade of claim 1, further comprising an opening providing flow communication between tip flow circuit and the first section of the center flow circuit.

5. The turbine blade of claim 1, further comprising a plurality of pressure side wall openings formed through the concave pressure side wall in flow communication with the pressure side flow circuit.

6. The turbine blade of claim 1, further comprising a plurality of leading edge cooling holes formed through the concave pressure side wall in flow communication with the first section of the center flow circuit.

7. The turbine blade of claim 1, further comprising a plurality of leading edge cooling holes formed through the convex suction side wall in flow communication with the first section of the center flow circuit.

8. An air-cooled turbine blade having a convex suction side wall, a concave pressure side wall, a leading edge wall, a trailing edge wall, a root and a tip, the walls and the tip each including an interior surface that defines an interior with the root, the leading edge wall including a plurality of openings, and the trailing edge wall including a plurality of slots thereon, the turbine blade comprising:

a suction side flow circuit formed within the blade interior and defined at least by the interior surface of the convex suction side wall, the suction side flow circuit comprising a forward flow circuit, an aft flow circuit, and a tip flow circuit, the forward flow circuit extending from the root to the tip and comprising, a serpentine passage, a first outlet, and a second outlet, the first outlet in communication with the aft flow circuit, and the second outlet in communication with the tip flow circuit, the aft flow circuit extending from the root in flow communication with the forward flow circuit and at least one of the trailing edge slots, and the tip flow circuit extending along the tip interior surface to at least one of the trailing edge slots and comprising a pin bank section, a first opening, and a second opening, the first opening in flow communication with the forward flow circuit outlet, and the second opening in flow communication with the suction side forward flow circuit;

a pressure side flow circuit formed within the blade interior and defined at least by the interior surface of the concave pressure side wall;

a center flow circuit including a first section, a second section, and a plurality of channels, the first section disposed between the suction side flow circuit and the pressure side flow circuit, and the second section in flow communication with the first section and the plurality of openings of the leading edge wall and defined at least partially by the interior surface of the leading edge wall, and the plurality of channels extending between the first and the second sections providing flow communication therebetween; and a plurality of pressure side wall openings formed through the concave pressure side wall in flow communication with the pressure side flow circuit.

9. The turbine blade of claim 8, further comprising a plurality of tip wall cooling holes formed through the tip in flow communication with the tip flow circuit.

10. The turbine blade of claim 8, further comprising an opening providing flow communication between the tip flow circuit and the first section of the center flow circuit.

11. The turbine blade of claim 8, further comprising a plurality of leading edge cooling holes formed through the concave pressure side wall in flow communication with the first section of the center flow circuit.

12. The turbine blade of claim 8, further comprising a plurality of leading edge cooling holes formed through the convex suction side wall in flow communication with the suction side flow circuit.

13. A method of manufacturing a blade having an airfoil shape defined by a convex suction side wall, a concave pressure side wall, a leading edge, a trailing edge, a root and a tip, the walls and the tip each including an interior surface that defines an interior with the root, the trailing edge including a plurality of slots formed thereon, the method comprising the steps of:

forming a plurality of cores shaped substantially similarly to a plurality of flow circuits including:

a suction side flow circuit formed within the blade interior and defined at least by the interior surface of the convex suction side wall, the suction side flow circuit comprising a forward flow circuit, an aft flow circuit, and a tip flow circuit, the forward flow circuit extending from the root to the tip and comprising, a serpentine passage, a first outlet, and a second outlet, the first outlet in communication with the aft flow circuit, and the second outlet in communication with the tip flow circuit, the aft flow circuit extending from the root in flow communication with the forward flow circuit and at least one of the trailing edge slots, and the tip flow circuit extending along the tip interior surface to at least one of the trailing edge slots and comprising a pin bank section, a first opening, and a second opening, the first opening in flow communication with the forward flow circuit outlet, and the second opening in flow communication with the suction side forward flow circuit, a pressure side flow circuit formed within the blade interior and defined at least by the interior surface of the concave pressure side wall, and a center flow circuit including a first section and a second section, the first section disposed between the suction side flow circuit and the pressure side flow circuit, and the second section in flow communication with the first section and the plurality of openings of the leading edge wall and defined at least partially by the interior surface of the leading edge wall;

forming the blade around the cores; and
removing the cores from the blade.

14. The method of claim 13, wherein the step of forming comprises forming a core substantially similar to the center flow circuit, wherein the center flow circuit includes a plurality of channels between the first and the second sections providing flow communication therebetween.

15. The method of claim 14, further comprising the step of forming a plurality of openings through the leading edge wall of the blade, wherein the openings communicate with the first section of the center flow circuit.

16. The method of claim 14, further comprising the step of forming a plurality of openings through the pressure side wall, wherein the openings communicate with the pressure side flow circuit.

* * * * *